(12) United States Patent
Hussain et al.

(10) Patent No.: US 8,199,906 B2
(45) Date of Patent: Jun. 12, 2012

(54) IMPLEMENTATION OF A COMMUNICATION LINK IN POWERED DEVICE FOR LAYER 2 SUPPORT

(75) Inventors: Asif Hussain, Tustin, CA (US); Manisha Pandya, Anaheim Hills, CA (US)

(73) Assignee: Broadcom Corporation, Irvine, CA (US)

( * ) Notice: Subject to any disclaimer, the term of this patent is extended or adjusted under 35 U.S.C. 154(b) by 1501 days.

(21) Appl. No.: 11/581,355

(22) Filed: Oct. 17, 2006

(65) Prior Publication Data
US 2008/0089512 A1 Apr. 17, 2008

(51) Int. Cl.
*H04M 9/00* (2006.01)

(52) U.S. Cl. .............. 379/406.01; 379/395.01; 379/413; 713/300; 713/320

(58) Field of Classification Search ............. 379/395.01, 379/413; 713/300, 301, 320
See application file for complete search history.

(56) References Cited

U.S. PATENT DOCUMENTS

| | | | | |
|---|---|---|---|---|
| 5,289,359 | A | * | 2/1994 | Ziermann .................. 363/21.11 |
| 2006/0214253 | A1 | * | 9/2006 | Camagna et al. ............. 257/499 |
| 2007/0025452 | A1 | * | 2/2007 | Schindler ...................... 375/257 |

OTHER PUBLICATIONS

IEEE 802.1AB-2005 (May 6, 2005), pp. 12-15.*

* cited by examiner

*Primary Examiner* — Walter F Briney, III
(74) *Attorney, Agent, or Firm* — Duane S. Kobayashi

(57) ABSTRACT

A system and method for enabling communication between power source equipment and a powered device chip. In one embodiment, communication between the power source equipment and the powered device chip is enabled through a communication link established between the powered device chip and a host device on the powered device.

26 Claims, 2 Drawing Sheets

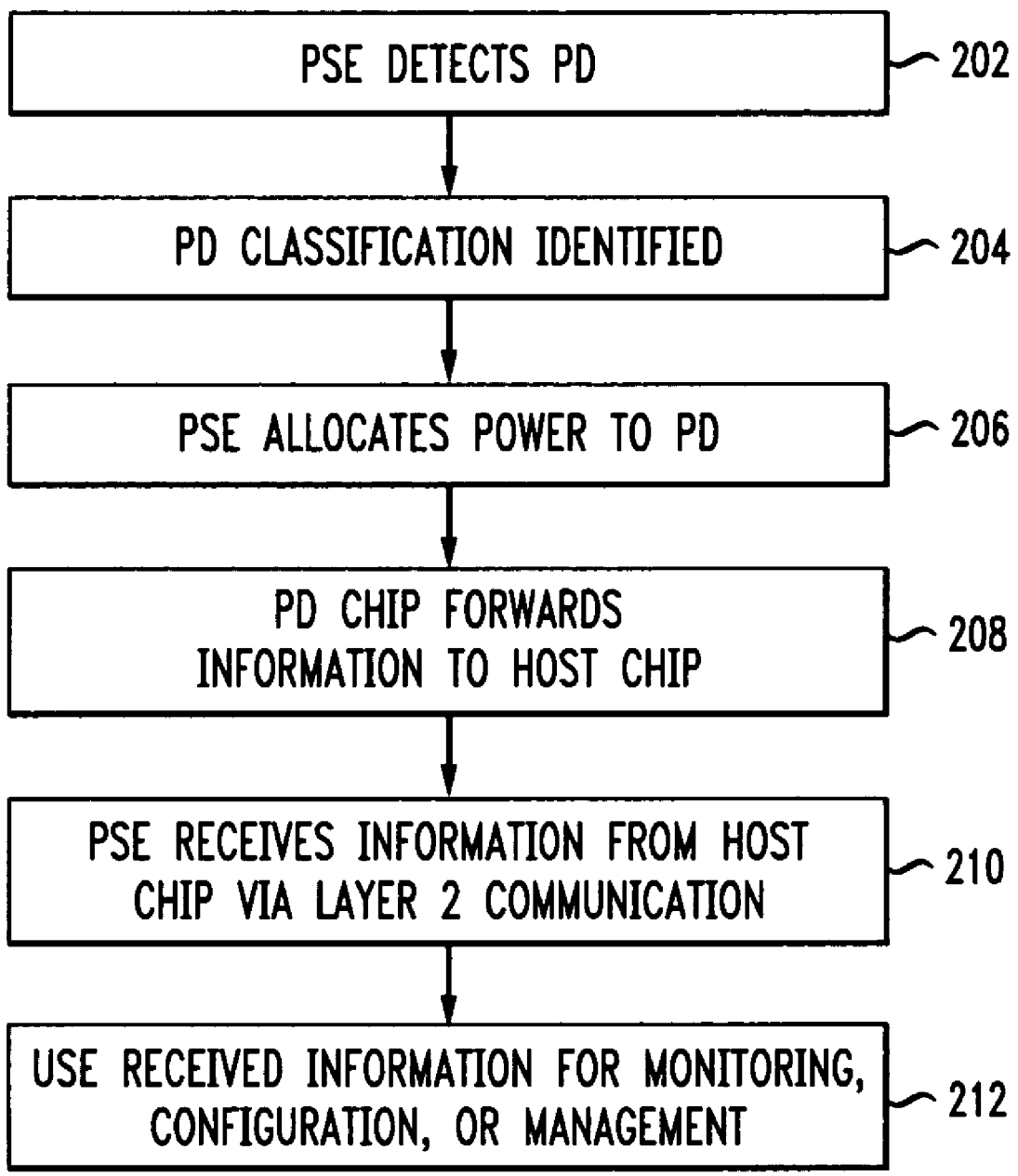

IMPLEMENTATION OF A COMMUNICATION LINK IN POWERED DEVICE FOR LAYER 2 SUPPORT

BACKGROUND

1. Field of the Invention

The present invention relates generally to Power over Ethernet (PoE) and, more particularly, to the implementation of a communication link in a powered device to further enhance Layer 2 support concepts such as those set forth by the IEEE802.3af Task Force.

2. Introduction

The IEEE 802.3af PoE standard provides a framework for delivery of power from power source equipment (PSE) to a powered device (PD) over Ethernet cabling. In this PoE process, a valid device detection is first performed. This detection process identifies whether or not it is connected to a valid device to ensure that power is not applied to non-PoE capable devices.

After a valid PD is discovered, the PSE can optionally perform a power classification. IEEE 802.3af defines five power classes for a PD device. The completion of this power classification process enables the PSE to manage the power that is delivered to the various PDs connected to the PSE. If a particular power class is identified for a particular PD, then the PSE can allocate the appropriate power for that PD.

Once the power is connected to the device, the PSE uses either AC or DC Disconnect method to find out whether or not the device is still connected. In the DC disconnect method, the PSE detects that the PD load current has dropped down to a certain value to conclude that the device has been disconnected. In the AC disconnect method, the PD disconnect is examined by the AC impedance of the PD by the PSE, which is accomplished by sending an AC probing signal. Monitoring the occurrence of a disconnect condition is crucial to ensuring that power delivery is also discontinued over that Ethernet line.

As this PD connection and disconnection process illustrates, the detection of a condition of a PD is crucial. In general, this reflects the importance of the PSE being aware of an operating condition of PDs. What is needed in this context is a mechanism that enhances the PSE's visibility into the state or condition of operation of a connected PD.

SUMMARY

A system and/or method for implementation of a communication link in powered device for layer 2 support, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2 illustrates a flowchart of a process of receiving information from a powered device.

DETAILED DESCRIPTION

Figure 1:
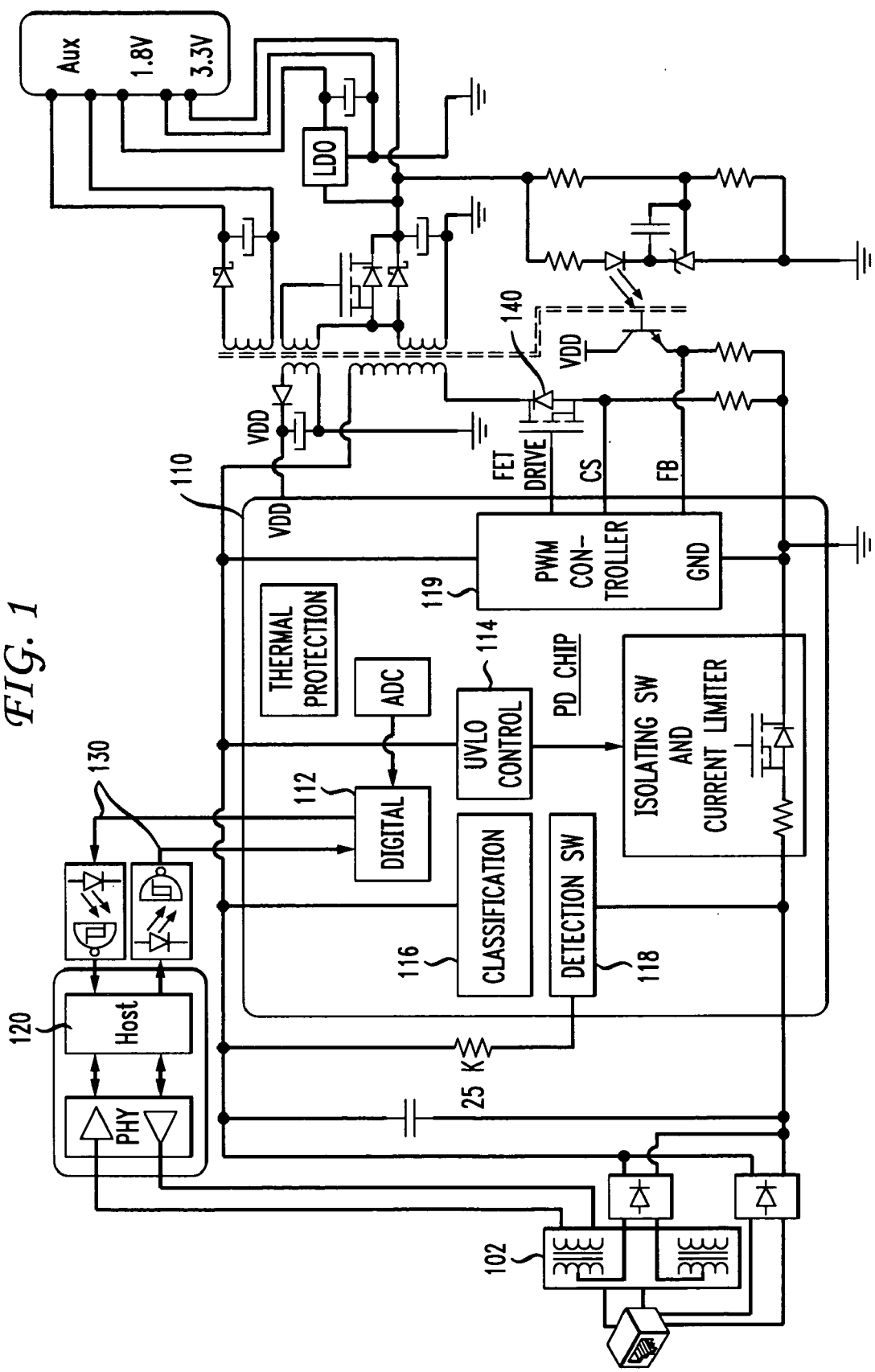
FIG. 1 illustrates an embodiment of a powered device having a communication interface to a powered device chip.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The IEEE 802.3af Power over Ethernet (PoE) standard outlines a process by which power source equipment (PSE) can detect, classify, and allocate power to powered devices (PDs) that are connected to the PSE via Ethernet cable. In the PoE detection process it is crucial to ensure that power is only allocated to appropriately configured devices. This detection process also prevents non-PoE devices from being damaged by the PSE's 48V output. Proper detection of PDs is crucial for all other aspects of a PSE's function.

FIG. 1 illustrates an embodiment of a PD chip 110 that can be incorporated in a media endpoint device (e.g., Internet Protocol phone, wireless access point, etc.) or network connectivity device (e.g., switch). In the illustrated embodiment, the PD is designed to source power through the data lines. Specifically, the PD sources power through the center tap of data transformers 102.

As further illustrated, PD chip 110 includes a detection switch 118 that controls when the signature 25 k$\Omega$ resistance is applied as a load across the line. In this detection stage, the PSE typically outputs a current limited detection voltage in the range of 2.5V to 10V. If the PSE detects the proper signature resistance, then it is determined that a proper PD is at the end of the link.

The PSE then proceeds to the classification step. While the classification step is optional, customers may well expect classification because unclassified devices would unnecessarily waste power and capacity of the PSE.

In the classification step, the PSE applies more voltage (up to 20.5V) to the link, and measures the current drawn by classification element 116 between the 15.5V-20.5V range to determine the classification of the PD. Table 1 below shows the five PD classes identified in the 802.3af standard. Future standards such as 802.3 at will feature a greater number of defined PD classes.

TABLE 1

| Class | Usage | Min Power Output by PSE | Max Power Input at PD |
|---|---|---|---|
| 0 | Default | 15.4 W | 0.44 to 12.95 W |
| 1 | Optional | 4.0 W | 0.44 to 3.84 W |
| 2 | Optional | 7.0 W | 3.84 to 6.49 W |
| 3 | Optional | 15.4 W | 6.49 to 12.95 W |
| 4 | Reserved | Act as Class 0 | Reserved |

Once the PSE has classified the PD, the PD is then supplied with full operating voltage. Under-voltage lockout (UVLO) element 114 is included in PD chip 110 in part due to the length of cabling (e.g., 100 meters) over which power may be supplied. UVLO element 114 ensures that the voltage at the PD is high enough such that the voltage will not drop below the minimum working voltage when load current is drawn from the cable. This prevents the pulse width modulation (PWM) DC:DC controller 119 from starting up and shutting down repeatedly as power is initially applied to the link.

UVLO element 114 also ensures that the PWM controller 119 does not operate during the detection and classification stages.

PWM controller 119 controls the operation of power field effect transistor (FET) 140, which provides usable power to the PD once the full operating voltage, for the detected or default PD class, is applied to the line by the PSE. In the embodiment of FIG. 1, FET 140 is illustrated as being separate from PWM controller 119. In an alternative embodiment, FET 140 is integrated with PWM controller 119.

Once the PD is powered, the PSE is designed to sense when a PD is disconnected. This disconnect detection enables the PSE to power down the link immediately. The PSE can also be designed to protect the cable and the PD from overcurrent and short-circuit conditions.

During the operation of the PD under power, PD chip 110 can be designed to monitor the operating condition or state of the power delivery to the PD. For example, PD chip 110 can be designed to monitor power delivery parameters such as the actual power consumption of the PD, the current passed through to the PD, the chip or die temperature, and the power classification. PD chip 110 can also be designed to monitor the operation of PD chip 110 during detection, classification, and powering stages. Here, anomalous operating conditions, error conditions (e.g., comparison of actual power versus allocated power), or other violations can be detected by PD chip 110.

These various types of information that are generated by PD chip 110 are useful in monitoring and controlling the overall operation of power delivery from the PSE to the PD. This information can be useful to the PSE itself in controlling the delivery of power to a particular PSE, or to an administrator that is overseeing the operation of the various deployed PDs.

Access to the information that can be provided by PD chip 110 is therefore a crucial aspect of general PoE network administration. Identifying an efficient mechanism for such communication is therefore a key. One communication option would require the inclusion of elements within PD chip 110 that could support direct communication between PD chip 110 and the PHY or host chip (e.g., enterprise IP phone chip). With this communication link between PD and PHY or host chip, the IP phones, Wireless Access Points, etc. using such a PD chip can send this additional information over Layer 2 which then can be used by the PSE. In general, Layer 1 communication using PD chip 110 would be expensive, have a slower response time, and suffer from relative inaccuracies. Moreover, some information that is generated by PD chip 110 could not be communicated over a Layer 1 protocol.

It is therefore a feature of the present invention that operation and status information generated by PD chip 110 can be communicated to the PSE using an inexpensive communication mechanism. This inexpensive communication mechanism is based on Layer 2 communication between the PD and the PSE. Significantly, this Layer 2 communication is enabled via existing functionality that resides outside of PD chip 110.

To illustrate this feature of the present invention, reference is made again to the example embodiment illustrated in FIG. 1. As is further illustrated, PD chip 110 also includes a digital communication component 112 that interfaces with communication link 130. Communication link 130 is also connected to host chip 120. In one embodiment, communication link 130 is a serial communication link that can be enabled by such technologies as I2C, SBI, UART, or the like.

Communication link 130 enables PD chip 110 to transmit operation and status information to host chip 120. In various embodiments, host chip 120 can be embodied as a microcontroller, a PHY, a switching chip, an enterprise Internet Protocol phone chip, a wireless access point chip, or the like. The operation and status information would then be transmitted by host chip 120 to the PSE via a PHY transceiver or the like. It should also be noted that PD chip 110 could also be designed to communicate information directly to the PHY transceiver or the host chip for delivery to the PSE. In various embodiments, the Layer 2 communication between host chip 120 and the PSE is a Layer 2 communication that can be enabled by the Link Layer Discovery Protocol-Media Endpoint Discover (LLDP-MED), IEEE 802.1 ab Operation, Administration and Maintenance (OAM), or the like.

As communication link 130 is a bi-directional transmission channel, communication link 130 can also enable host chip 120 to send information to PD chip 110 for various configuration purposes. For example, host chip 120 can send information to PD chip 110 that can be used by PD chip 110 for power limiting, power scaling, etc.

In general, communication link 130 enables the addition of intelligence into PD chip 110. In conventional systems, PD chip 110 would only respond to PSE signal probes. The extent of that form of PD chip communication would be in the line signal characteristics that are measured by the PSE. Thus, it is a feature of the present invention that PD chip 110 can now communicate with the PSE as part of a general query/response protocol. While details of this query/response protocol would be implementation specific, the protocol would enable PD chip 110 to intelligently respond to requests that are sent by the PSE. This form of intelligence in PD chip 110 enables the PD to operate in new capacities in monitoring, configuration, and management of the PoE network.

To illustrate an example of the use of the intelligence in PD chip 110, reference is now made to the flowchart of FIG. 2. As illustrated, the flowchart of FIG. 2 begins at step 202 where the PSE detects the PD. As noted above, this detection process is enabled using a 25 kΩ resistor, which is applied as a load across the line based upon the activation of detection switch 118 of PD chip 118. The PD is detected by the PSE once the PSE detects the proper signature impedance.

After the PSE detects the PD, the PSE, at step 204, then identifies the classification of the PD. In the classification step, the PSE measures the current drawn by classification element 116 of PD chip 110 when the voltage output by the PSE is between the 15.5V-20.5V range. The response measured by the PSE is used to classify the PD, for example, in accordance with the five PD classes specified by the 802.3af standard. Based on this determined classification, the PSE, at step 206, then allocates power to the PD.

It is at this point in the process that the initial Layer 1 configuration is established between the PSE and PD chip 110. The PSE would then monitor the connection to determine when the PD has been disconnected.

It is a feature of the present invention that further communications can also be enabled between the PSE and host chip 120 to support Layer 2 communications, which communications would supplement the Layer 1 communications of steps 202-206. In the illustrated embodiment of FIG. 1, digital communications component 112 can be designed to transmit operation and/or status information that is generated by or otherwise resident within PD chip 110. This transmission to host chip 120 occurs at step 208 and is enabled through communication link 130.

Next, at step 210, host chip 120 forwards the received operation and/or status information to the PSE. This transmission is enabled via the existing Layer 2 communication that is supported by host chip 120. In this manner, PD chip 110 leverages existing communication functionality within the PD.

At step 212, the information received by the PSE from host chip 120 can be used for any monitoring, configuration, or management purpose by the PSE or any other element that gains access to the information. As would be appreciated, the particular use of the received information would be implementation dependent.

To illustrate the potential value of this received information, consider the following example that relates to PD classification. In this case, the information that is received by the PSE could be the actual classification for which the PD was designed. Here, this actual classification information could be received by the PSE and used as a check to ensure that the initial classification identified by the PSE is accurate. This augmented classification process would ensure that inaccurate classifications, or default classifications, would be corrected based upon a PD's own accurate classification. Also, this classification information can have greater levels of granularity. In fact, the use of Layer 2 communication as part of the configuration process could obviate the need for the use of the optional classification step by the PSE. Here, a default classification could be used initially and changed upon receipt of the accurate classification information via the Layer 2 communication.

In another example, the received information could be used simply to monitor the operation of PD chip 110. Here, PD chip 110 can be designed to forward information related to any operating aspect of its components (e.g., current drawn, temperature, etc.). This information can be used, for example, to monitor whether dangerous operating conditions are present on the PD location.

As noted above, communication link 130 is a bi-directional communication channel. As such, communication link 130 can also be used to forward information from PD chip 110 to host chip 120 as well as from host chip 120 to PD chip 110. In the latter context, the information forwarded from host chip 120 to PD chip 110 can be used for configuration purposes or as part of a more general query/response protocol. For example, in the context of the process of FIG. 2, the forwarding of information by PD chip 110 to host chip 120 in step 208 can be in response to a previous request sent by the PSE (e.g., request for accurate classification information). In another example, the information sent by the PSE to PD chip 110 via host chip 120 can be used to configure or otherwise modify an aspect of operation of PD chip 110 (e.g., power limiting, power scaling, etc.)

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A powered device that receives power over a network cable that couples said powered device to a power source equipment, comprising:
    a physical layer communication component that enables data communication between said powered device and said power source equipment, said physical layer communication component being coupled to said network cable via data transformers;
    a powered device chip that is coupled to said network cable via said data transformers, said powered device chip including signature detection components that enable detection of said powered device by said power source equipment, and a power controller that controls power delivered by a field effect transistor to a load on said powered device;
    a host module that is coupled to said physical layer communication component, said host module being configured to support a Layer 2 communication protocol between said host module and said power source equipment; and
    a communication link that connects said powered device chip to said host module, said communication link enabling operation information from said powered device chip to be transmitted to said host module for communication of said operation information by said host module to said power source equipment via said Layer 2 communication protocol.

2. The powered device of claim 1, wherein said signature detection components are coupled to a 25 kΩ resistor.

3. The powered device of claim 1, wherein said powered device chip further includes power classification components that enables said power source equipment to determine a power classification of the powered device.

4. The powered device of claim 1, wherein said power controller is a pulse width modulation controller.

5. The powered device of claim 1, wherein said field effect transistor is external to said powered device chip.

6. The powered device of claim 1, wherein said field effect transistor is incorporated in said powered device chip.

7. The powered device of claim 1, wherein said powered device chip conforms to IEEE 802.3af.

8. The powered device of claim 1, wherein said host module is one of a microcontroller, a PHY chip, a switching chip, an Internet Protocol phone chip, and a wireless access point chip.

9. The powered device of claim 1, wherein said communication link is a serial link.

10. The powered device of claim 1, wherein said Layer 2 communication protocol is a Link Layer Discovery Protocol-Media Endpoint Discover.

11. The powered device of claim 1, wherein said Layer 2 communication protocol is 802.1AB operations, administration, and maintenance.

12. The powered device of claim 1, wherein said operation information is one of actual power consumption, current, temperature, power class, and status reporting information.

13. The powered device of claim 1, wherein said communication link enables said power source equipment to send a query to said powered device, and to return a response to said query from said powered device.

14. A powered device that receives power over a network cable that couples said powered device to a power source equipment, comprising:
    a physical layer communication component that enables data communication between said powered device and said power source equipment, said physical layer communication component being coupled to said network cable via data transformers;
    a powered device chip that is coupled to said network cable via said data transformers, said powered device chip including signature detection components that enable detection of said powered device by said power source equipment, and a power controller that controls power delivered by a field effect transistor to a load on said powered device;

a communication link that connects said powered device chip to a host module, said host module coupled to said physical layer communication component and being configured to support a Layer 2 communication protocol between said host module and said power source equipment, wherein said communication link enables operation information from said powered device chip to be transmitted to said host module for communication of said operation information by said host module to said power source equipment via said Layer 2 communication protocol.

15. A powered device that receives power over a network cable that couples said powered device to a power source equipment, comprising:

a physical layer communication component that enables data communication between said powered device and said power source equipment, said physical layer communication component being coupled to said network cable via data transformers;

a powered device chip that is coupled to said network cable via said data transformers, said powered device chip including signature detection components that enable detection of said powered device by said power source equipment, and a power controller that controls power delivered by a field effect transistor to a load on said powered device;

a communication link that connects said powered device chip to a host module, said host module coupled to said physical layer communication component and being configured to support a Layer 2 communication protocol between said host module and said power source equipment, wherein said communication link enables a forwarding of a request for operation information from said host module to said powered device, said request for operation information being received by said host module from said power source equipment via said physical layer communication component.

16. The powered device of claim 15, wherein said communication link is a serial link.

17. The powered device of claim 15, wherein said Layer 2 communication protocol is a Link Layer Discovery Protocol-Media Endpoint Discover.

18. The powered device of claim 15, wherein said Layer 2 communication protocol is 802.1AB operations, administration, and maintenance.

19. The powered device of claim 15, wherein said operation information is one of actual power consumption, current, temperature, power class, and status reporting information.

20. The powered device of claim 15, wherein said host module is one of a microcontroller, a PHY chip, a switching chip, an Internet Protocol phone chip, and a wireless access point chip.

21. A method in a powered device that receives power over a network cable that couples said powered device to a power source equipment, said powered device including a powered device chip having signature detection components that enable detection of said powered device by said power source equipment and a power controller that controls power delivered by a power transistor to a load on said powered device, comprising:

forwarding operation information from said powered device chip to a host module via a communication link that connects said powered device chip to said host module, said host module being coupled to a physical layer communication component in said powered device that enables data communication between said powered device and said power source equipment; and transmitting said operation information from said host module to said power source equipment using a Layer 2 communication protocol.

22. The method of claim 21, wherein said host module is one of a microcontroller, a PHY chip, a switching chip, an Internet Protocol phone chip, and a wireless access point chip.

23. The method of claim 21, wherein said communication link is a serial link.

24. The method of claim 21, wherein said Layer 2 communication protocol is a Link Layer Discovery Protocol-Media Endpoint Discover.

25. The method of claim 21, wherein said Layer 2 communication protocol is 802.1AB operations, administration, and maintenance.

26. The method of claim 21, wherein said operation information is one of actual power consumption, current, temperature, power class, and status reporting information.

* * * * *